US006748351B1

(12) United States Patent
Hynes et al.

(10) Patent No.: US 6,748,351 B1
(45) Date of Patent: Jun. 8, 2004

(54) MODULAR COVERT REMOTE ELECTRONIC WARFARE SIMULATOR

(75) Inventors: Mark W. Hynes, Fort Huachuca, AZ (US); Robert L. Weeks, Fort Huachuca, AZ (US); James L. Cole, Fort Huachuca, AZ (US); Robert E. Reiner, Fort Huachuca, AZ (US); Timothy T. Taylor, Portland, OR (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 720 days.

(21) Appl. No.: 09/718,153

(22) Filed: Nov. 22, 2000

Related U.S. Application Data

(60) Provisional application No. 60/198,659, filed on Apr. 20, 2000.

(51) Int. Cl.[7] .............................. G06G 7/62; G01S 7/40
(52) U.S. Cl. .............................. 703/13; 703/6; 703/7; 703/22; 342/171; 342/169; 342/170; 342/13; 342/16; 342/17; 342/18; 342/19
(58) Field of Search .......................... 703/13, 6, 7, 22; 342/13, 16, 17, 18, 19, 169, 170, 171

(56) References Cited

U.S. PATENT DOCUMENTS

| | | | | | |
|---|---|---|---|---|---|
| 4,192,082 A | * | 3/1980 | Deaton et al. | ................. | 434/2 |
| 4,666,407 A | * | 5/1987 | Jones | ........................... | 434/2 |
| 4,969,819 A | * | 11/1990 | James | .......................... | 434/5 |
| 5,010,342 A | * | 4/1991 | Jones, Jr. | .................... | 342/169 |
| 5,133,663 A | * | 7/1992 | Willingham et al. | ........... | 434/2 |
| 5,134,412 A | * | 7/1992 | Baseghi et al. | ............. | 342/169 |
| 5,150,127 A | * | 9/1992 | Aw | ............................. | 342/169 |
| 5,313,209 A | * | 5/1994 | Michaels et al. | ............. | 342/13 |
| 5,341,146 A | * | 8/1994 | Vennum et al. | ............. | 342/170 |
| 5,359,329 A | * | 10/1994 | Lewis et al. | ................... | 342/17 |
| 5,549,477 A | * | 8/1996 | Tran et al. | ...................... | 434/5 |
| 5,886,626 A | * | 3/1999 | Hynes et al. | ............... | 342/169 |

OTHER PUBLICATIONS

Loo, James et al. "The Dreo Electronic Warfare Engagement Simulation Facility" IEEE 1993, Elecrical and Computer Engineering, 1993. Canadian Conference on 14–17 1993, pp. 1097–1114.*

Vaccarino, Carmine A. et al. "Real–Time Simulation For Verification Of Tactical Electronic Warfare System" Proceedings of the 1978 annual conference, Dec. 1978, pp. 334–341.*

* cited by examiner

Primary Examiner—Wilbert L. Starks, Jr.
Assistant Examiner—Thomas Pham
(74) Attorney, Agent, or Firm—Alan P. Klein

(57) ABSTRACT

An apparatus for electronic warfare signal simulation which is used in an external test system to simultaneously test a plurality of "victim" communication systems for vulnerability to jamming. The test system includes a remote radiator of a signal free of jamming effects, and a remote radiator of one or more radio frequency control signals which represent one or more predetermined jamming threats in the low and mid bands. The simulation apparatus has a pair of couplers, each adapted to be coupled between a respective one of a plurality of "victim" antennas and its associated "victim" receiver, for coupling off the control signals to a receiving circuit, a plurality of modules for generating simulated jamming signals, and a band select circuit for translating the frequency of each simulated jamming signal, setting its level to that determined for its control signal, and replicating the "victim" antenna gains, and feeding the modified simulated jamming signals together with the desired signal to the plurality of "victim" receivers.

20 Claims, 4 Drawing Sheets

MODULAR COVERT REMOTE ELECTRONIC WARFARE SIMULATOR

CROSS-REFERENCE TO RELATED APPLICATIONS

This application claims priority from U.S. Provisional Patent Application Serial No. 60/198,659 filed Apr. 20, 2000.

BACKGROUND OF INVENTION

This invention relates in general to testing communications systems, and more particularly to testing by simulation.

The difficulties of testing military tactical communications systems for vulnerability to electronic warfare jamming are known. To perform realistic jamming tests, actual jamming signals must be radiated. Such jamming signals interfere with other systems operating in, or close to, the jamming testing area. Therefore, jamming tests must be limited in location and to late night or early morning hours. In addition, the frequencies, power levels, and jamming modulation types used may be subject to restrictions imposed by security and safety personnel, by the Federal Aviation Administration and by the Federal Communications Commission. If the jamming signal radiator must be airborne, the cost of conducting the test will be high. Repeatability of test conditions is also a major concern because of the difficulty in duplicating environmental variations.

SUMMARY OF THE INVENTION

It is therefore one object of this invention to simultaneously test the jamming vulnerability of a plurality of "victim" communications systems without having to radiate actual jamming signals.

It is another object to carry out such testing while correcting for environmental variations between tests.

It is yet another object to test the jamming vulnerability of the "victim" communication systems to a plurality of jamming signal sources in two operating bands.

These and other objects of the invention are achieved by an apparatus for electronic warfare signal simulation. The simulation apparatus is used together with a remote radiator of a signal free of jamming effects, and a remote radiator of one or more radio frequency control signals which represent one or more predetermined jamming threats in the low and mid bands. The simulation apparatus has a pair of coupling means, each adapted to be connected between a respective one of a plurality of "victim" antennas and its associated "victim" receiver. One coupling means couples off control signals representing jamming threats in the low band from the received signals and passes them to a receiving circuit. The other coupling means couples off control signals representing jamming threats in the mid band from the received signals and passes them to the receiving circuit. The simulation apparatus contains a plurality of modules for generating simulated jamming signals each having a waveform representative of the jamming threat represented by a respective control signal. On command from a control means in the simulation apparatus, the receiving circuit measures the level of the received control signals which is the level an actual jamming signal from the corresponding jamming threat would had. A band select circuit translates the frequency of each simulated jamming signal to the frequency of the jamming threat to which it corresponds, sets its level to the jamming level determined for its control signal, replicates the "victim" antenna gains, and feeds the modified simulated jamming signals together with the desired signal to the plurality of "victim" receivers. In this way, the simulation apparatus replicates the jamming signals that would have been received by the "victim" receivers had they come from actual jamming sources.

The simulation apparatus is preferably of modular construction. The modular nature of the system enhances the performance in two ways. First, the system is easily maintained and upgraded because the modules can be removed and replaced without impact to the mechanical design or software control. Second, because each of the radio frequency modules in the system is housed in a separate radio frequency isolated compartment, cross-talk and interference between the various stages of the radio frequency chain are prevented thereby increasing the spectral purity of the simulated jamming signals.

Additional advantages and features will become more apparent as the subject invention becomes better understood by reference to the following detailed description when considered in conjunction with the accompanying drawings wherein:

DETAILED DESCRIPTION

Figure 1:
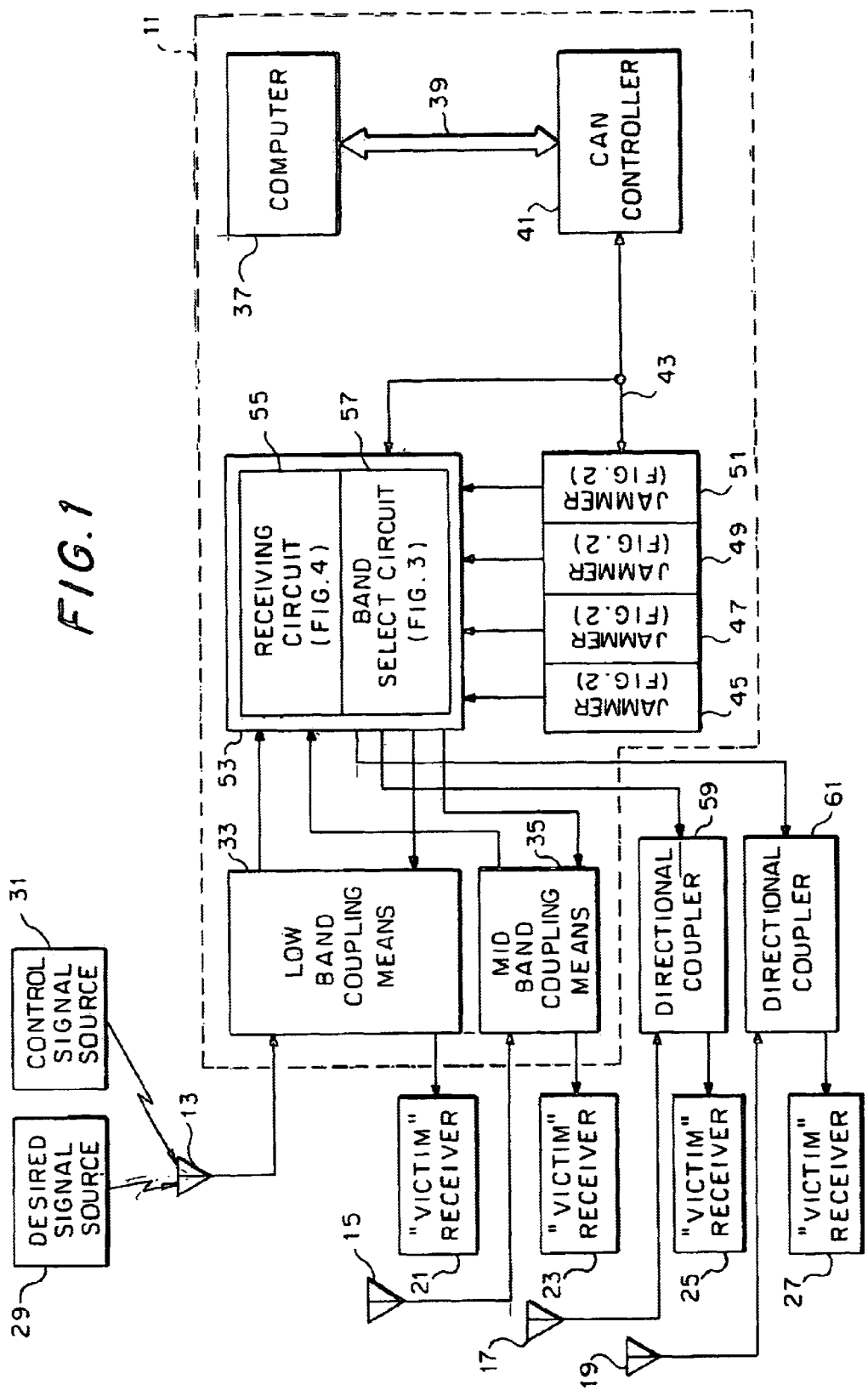
FIG. 1 is a block diagram of an embodiment of the modular covert remote electronic warfare simulator apparatus as used in an external field test system.

FIG. 1 shows an embodiment of the modular covert remote electronic warfare simulator apparatus 11 of the invention as used in an external field test system to simultaneously test a plurality of "victim" communication systems for vulnerability to jamming. By way of example, four "victim" antennas 13, 15, 17, 19 and associated "victim" receivers 21, 23, 25, 27 are shown. The test system also has a desired signal source 29 and a control signal source 31, each spaced apart from the communications systems.

In the illustrated embodiment, the modular covert remote electronic warfare simulator apparatus 11 has a low band (30–90 MHz) coupling means 33 which is adapted to be connected between one 13 of the plurality of "victim" antennas and its associated "victim" receiver 21, and a mid band (210–450 MHz) coupling means 35 which is adapted to be connected between another 15 of the plurality of "victim" antennas and its associated "victim" receiver 23. The low band coupling means may be a dual directional coupler, for example, a TRM model DDC1430. The mid bard coupling means may be a dual directional coupler, for example, a TRM model DDC 1431. In addition, the simulator apparatus 11 has a control means consisting, for example, of a computer 37 which communicates over a standard computer interface 39 to a controller area network controller 41 which in turn communicates over a standard controller area network interface 43 to the various radio frequency modules of the simulator apparatus 11. The computer may be, for example, a GESPAC Inc. model PCISYS-56. The computer interface may be, for example, a GESPAC Inc. model PC-104 interface. The controller area network controller may be, for example, a Digital Logic model MSMCAN. The simulator apparatus 11 also has a plurality (four are shown) of identical modules 45, 47, 49, 51 for generating simulated jamming signals connected to the control means. The output amplitude of each of the simulated jamming signal modules is fixed at a constant level of −15 dBm and its frequency is centered around a constant intermediate frequency of 836 MHz. Finally, the simulator apparatus 11 has a band select module 53 containing a receiving circuit 55 and a band select circuit 57. The receiving circuit 55 is connected to the control means and to the dual directional couplers 33, 35. The band select circuit 57 is connected to the control means, the simulated jamming signal modules 45, 47, 49, 51, the dual directional couplers 33, 35, and the "victim" receivers 25, 27 (through optional directional couplers 59, 61).

In operation, the desired signal source 29 generates and transmits to the "victim" antennas 13, 15, 17, 19, a desired signal which is free of jamming effects. At the same time, the control signal source 31 generates and transmits to the "victim" antennas 13, 15, 17, 19, one or more radio frequency control signals which represent one or more predetermined jamming threats in either or both of the low (30–90 MHz) and mid (210–450 MHz) bands. The control signals experience all of the real atmospheric conditions that would affect a real jamming signal transmitted from the same location. The low band dual directional coupler 33 couples off to the receiving circuit 55 the control signals representing jamming threats in the low band from the signals received by the antenna 13 and allows the desired signal to pass to its output with minimal perturbation. The mid band dual directional coupler 35 couples off to the receiving circuit 55 the control signals representing jamming threats in the mid band from the signals received by the antenna 15 and allows the desired signal to pass to its output with minimal perturbation.

Upon command from the control means, the following operation takes place. Each of the simulated jamming signal modules 45, 47, 49, 51, generates a simulated jamming signal having a waveform representative of the jamming threat represented by a respective control signal and feeds it to the band select circuit 57. The receiving circuit 55 receives the plurality of control signals that have been coupled off from the dual directional couplers. It measures the level of both the low and the mid band control signals by first measuring the level of the low band control signals, and then tuning to the mid band control frequency and measuring that level. This process is repeated many times per second thereby resulting in an accurate measurement of the level of the low and mid band control signals which is the level an actual jamming signal from the corresponding jamming threat would have had. The band select circuit 57 translates the frequency of each received simulated jamming signal to the frequency of the jamming threat to which it corresponds. Next, it sets the level of each simulated jamming signal to the jamming level determined for its control signal. Then it replicates the "victim" antenna gains. Finally, it feeds the modified simulated jamming signals through the low band dual directional coupler 33 together with the desired signal to the "victim" receiver 21. It feeds the modified simulated jamming signals through the mid band dual directional coupler 35 together with the desired signal to the "victim" receiver 23. It feeds the modified simulated jamming signals together with the desired signal (through the optional directional couplers 59, 61) to the remaining "victim" receivers 25, 27.

Figure 2:
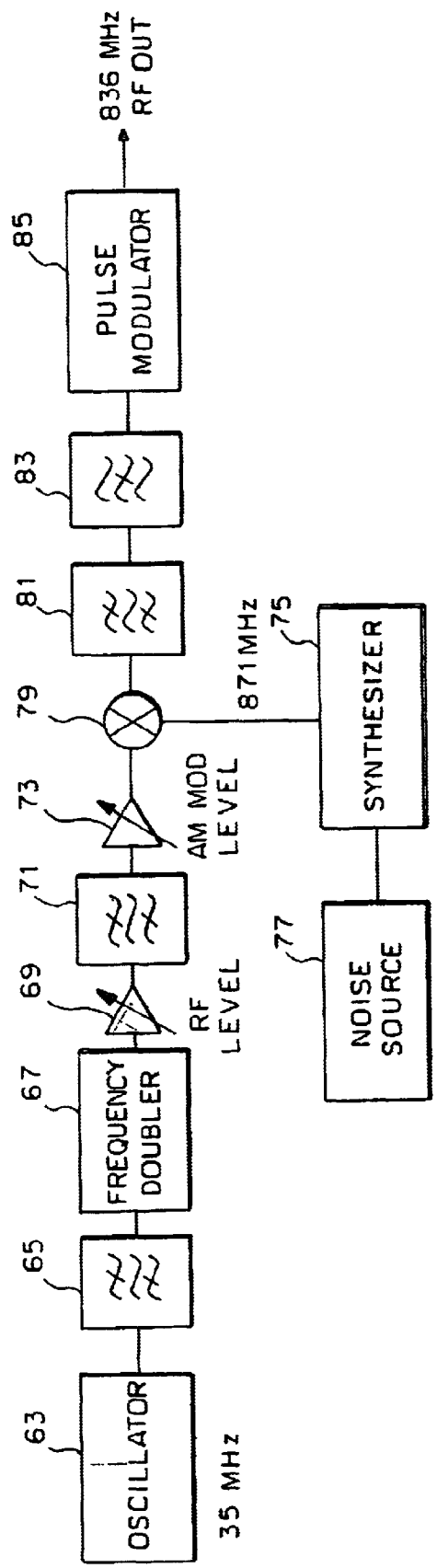
FIG. 2 is a block diagram of a simulated jamming signal module.

FIG. 2 is a block diagram of any of the identical simulated jamming signal modules 45, 47, 49, 51. An oscillator 63 generates a signal at 35 MHz, which is fed by way of a band pass filter 65 to a frequency doubler 67 to yield a 70 Hz signal. The 70 MHz signal is adjusted in amplitude in a variable gain amplifier 69 in response to a command from the controller 41 which monitors all of the attenuators. After filtering in a band pass filter 71, the 70 MHz signal is variably amplitude-modulated from 0 to 100% in a variable gain amplitude modulator 73 in response to a command from the controller 41. A synthesizer 75 digitally generates a waveform at 871 MHz, which is modulated with random noise generated by a noise diode circuit 77. This synthesized waveform at 871 MHZ is then mixed in a mixer 79 with the output from the amplitude modulator 73 to produce an output centered at 836 MHz. This output may have a combination of arbitrary amplitude modulation, arbitrary frequency modulation and/or noise modulation. Finally, the output from the mixer 79 after filtering in two band pass filters 81, 83, may be pulse-modulated in a pulse modulator 85 in response to a command from the controller 41 before exiting the simulated jamming signal module as a simulated jamming signal.

Figure 3:
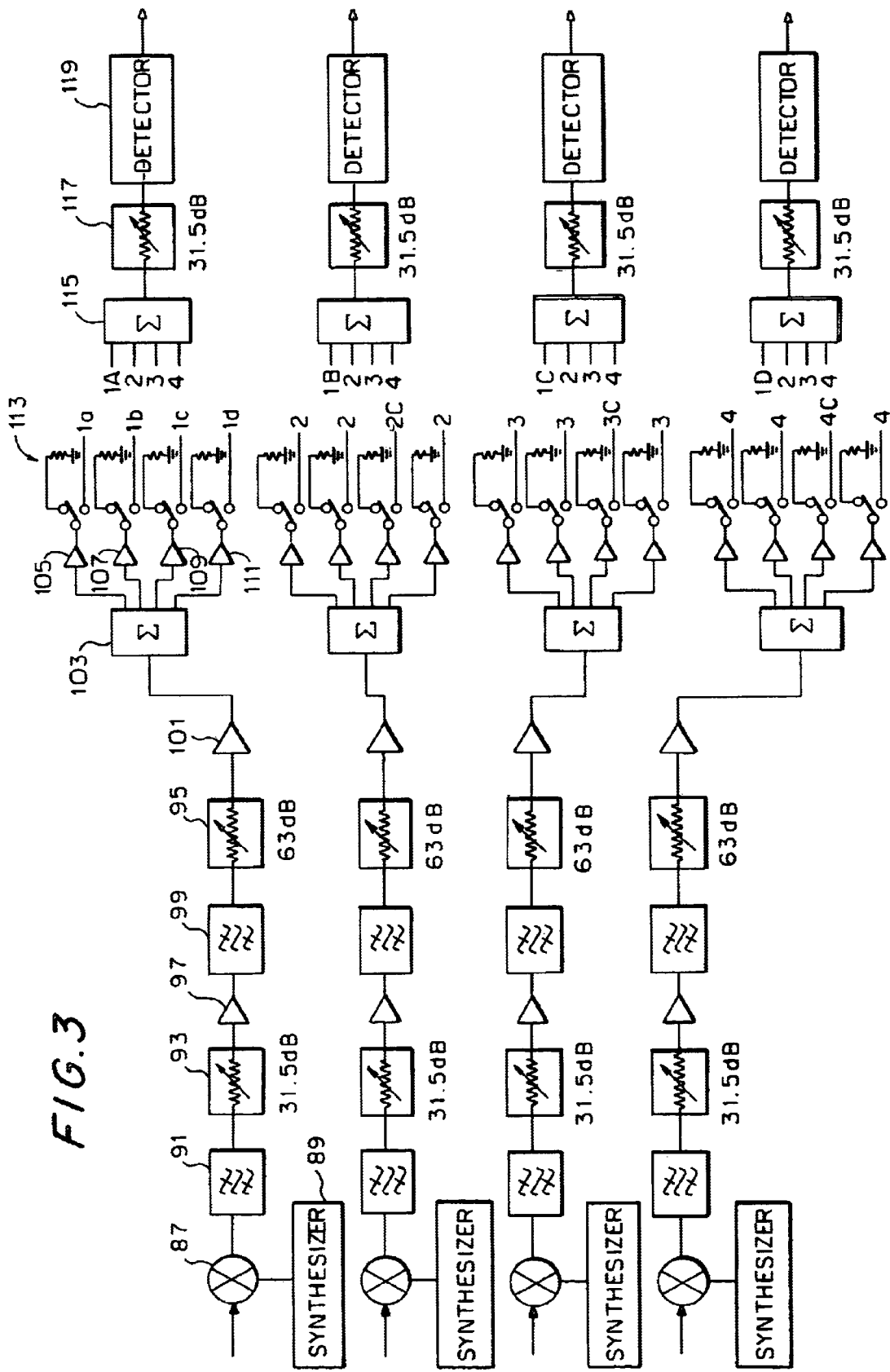
FIG. 3 is a block diagram of the band select circuit.

FIG. 3 is a block diagram of the band select circuit 57. This circuit has four inputs, one for each of the simulated jamming signal modules 45, 47, 49, 51. Attached to each input is a mixer 87 where the simulated jamming signal from the respective simulated jamming signal module is mixed with the output of a synthesizer 89 to translate its frequency to the frequency of the corresponding jamming threat. This frequency translating operation is performed in response to a command from the controller 41 which has received information from the receiving circuit 55 on what frequency the control signal is at. Next, the frequency-translated simulated jamming signal is filtered in a band pass filter 91 and attenuated in a pair of attenuators 93 and 95 to set its level to the jamming level determined for its control signal. The attenuation operation is performed in response to a command from the controller 41 which has received information from the receiving circuit 55 on what level the control signal is at. The attenuators 93 and 95 are separated by a fixed gain amplifier 97 and a filter 99 for harmonic rejection. The first attenuator 93 is adjustable in 0.5 dB increments. The second attenuator 95 is adjustable in 1.0 dB increments. Both attenuators can be set to full attenuation to shut off the simulated jamming signal which otherwise exits the attenuators as a modified simulated jamming signal. This modified simulated jamming signal is amplified in an amplifier 101, divided four ways by a splitter 103, is amplified in amplifiers 105, 107, 109, 111, and is fed to a matrix switch 113 which enables it to be directed to any or all of four combiners 115. The output of each combiner 115 is passed to a respective one of the four outputs of the band select circuit by way of an attenuator 117 and a detector 119 which allows monitoring and feedback control. The controller 41 knows which outputs are connected to which "victim" receivers and makes changes in the matrix switch 113 to guarantee correct jamming threat representation on the final radio frequency output. It also monitors and commands changes of the attenuator 117 to replicate the gain of the "victim" antenna (corresponding to the "victim" receiver fed by the respective output of the band select circuit 57).

Figure 4:
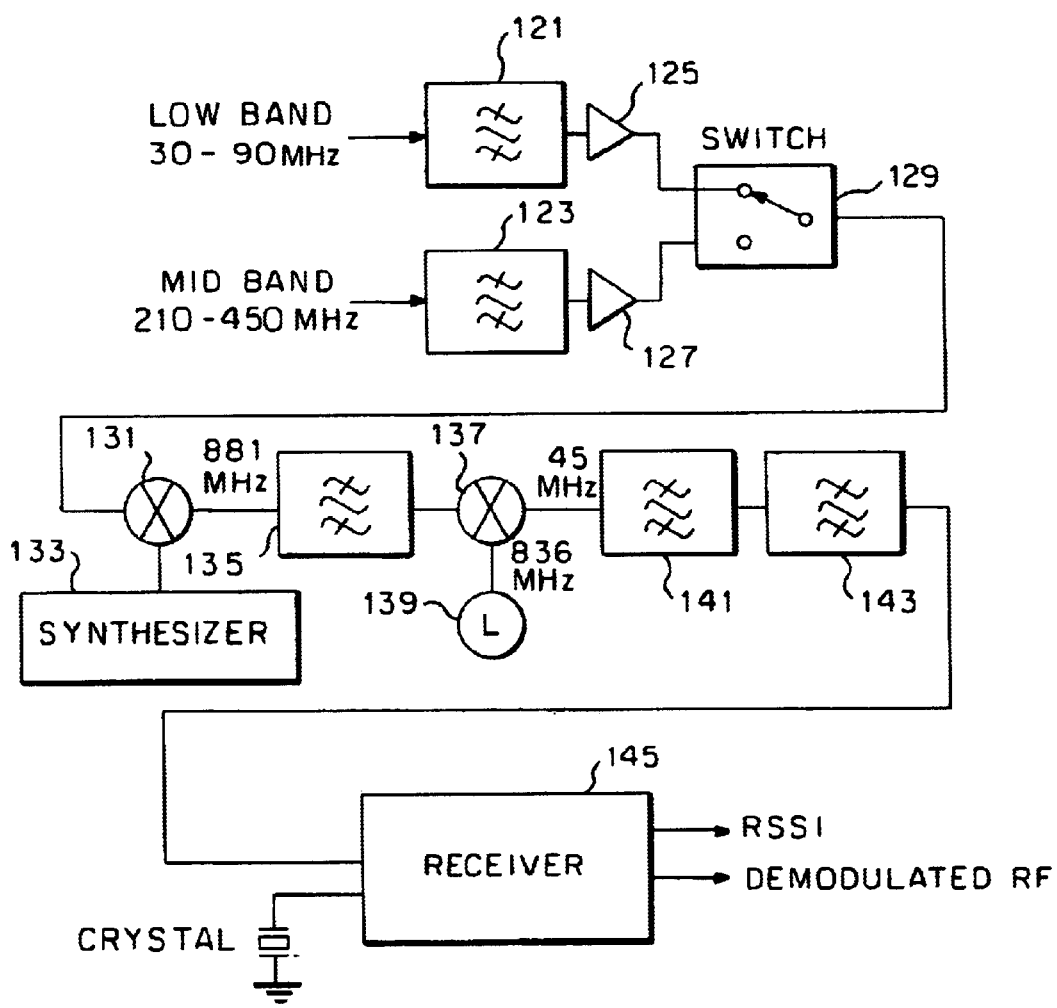
FIG. 4 is a block diagram of the receiving circuit.

FIG. 4 is a block diagram of the receiving circuit 55. The receiving circuit 55 has two inputs, one for the low band dual directional coupler 33 and one for the mid band dual directional coupler 35. Attached to each input is a band pass filter 121, 123, where a control signal coupled off from the respective dual directional coupler is filtered. Next, the control signal is amplified in an amplifier 125, 127, and passed to a switch 129. The switch 129 samples control signals from either of the two inputs of the receiving circuit 55 and passes them to a mixer 131 where they are mixed with the output of a synthesizer 133 and translated to an intermediate frequency at 881 MHz. This intermediate frequency signal is next filtered in a band pass filter 135 and mixed in a mixer 137 with the output of a local oscillator 139 at 836 MHz to down-convert the signal to an intermediate frequency of 45 MHz. The down-converted signal is filtered in two band pass filters 141, 143, and fed to a receiver 145 which may be, for example, a Philips Inc. model SA625. The outputted Received Signal Strength Indicator (RSSI) signal from the receiver 145, an output voltage that corresponds to a calibrated received level on the input to the receiver, e.g., −130 dB on the input may yield 1.5 volts on the output, is monitored by the controller 41 and used to adjust the attenuators 93 and 95 in the band select circuit 57 which set the simulated jamming signal's level.

It is obvious that many modifications and variations of the present invention are possible in light of the above teachings. It is therefore to be understood that within the scope of the appended claims, the invention may be practiced otherwise than as described.

What is claimed as new and desired to be secured by Letters Patent of the United States is:

1. In a field test system having a plurality of "victim" antennas and an equal plurality of associated "victim" receivers, means for generating and transmitting a desired signal free of jamming effects, and means for generating and transmitting one or more radio frequency control signals which represent one or more predetermined jamming threats in either or both of the low and mid bands, an apparatus for electronic warfare signal simulation comprising:

low band coupling means adapted to be connected between one of the plurality of "victim" antennas and its associated "victim" receiving apparatus for coupling off control signals representing jamming threats in the low band from the received signals and allowing the desired signal to pass with minimal perturbation;

mid band coupling means adapted to be connected between another of the plurality of "victim" antennas and its associated "victim" receiving apparatus for coupling off control signals representing jamming threats in the mid band from the received signals and allowing the desired signal to pass with minimal perturbation;

control means for controlling the elements of the simulation apparatus;

a plurality of simulated jamming signal means connected to the control means, each simulated jamming signal means for generating a simulated jamming signal having a waveform representative of the jamming threat represented by a respective control signal;

receiving means connected to the control means and to the low band and mid band coupling means for receiving the plurality of control signals from the low band and mid band coupling means and measuring the power level of each control signal to determine the level an actual jamming signal from the corresponding jamming threat would have had; and band select means connected to the control means, the simulated jamming signal means, and the low band and mid band coupling means, for receiving the simulated jamming signals, translating the frequency of each simulated jamming signal to the frequency of the jamming threat to which it corresponds, setting the level of each simulated jamming signal to the jamming level determined for its control signal, replicating the "victim" antenna gains, feeding the modified simulated jamming signals through the low band coupling means together with the desired signal to the "victim" receiver associated with the one "victim" antenna, feeding the modified simulated jamming signals through the mid band coupling means together with the desired signal to the "victim" receiver associated with the other "victim" antenna, and feeding the modified simulated jamming signals together with the desired signal to the remaining "victim" receivers.

2. The apparatus for electronic warfare signal simulation recited in claim 1 wherein the low band coupling means is a dual directional coupler.

3. The apparatus for electronic warfare signal simulation recited in claim 1 wherein the mid band coupling means is a dual directional coupler.

4. The apparatus for electronic warfare signal simulation recited in claim 1 wherein at least one simulated jamming means includes a digital synthesizer.

5. The apparatus for electronic warfare signal simulation recited in claim 1 wherein at least one simulated jamming signal means includes a pulse modulator.

6. The apparatus for electronic warfare signal simulation recited in claim 1 wherein at least one simulated jamming signal means includes a frequency doubler.

7. The apparatus for electronic warfare signal simulation recited in claim 1 wherein at least one simulated jamming signal means includes an amplitude modulator.

8. The apparatus for electronic warfare signal simulation recited in claim 1 wherein at least one simulated jamming signal means includes a noise diode circuit.

9. The apparatus for electronic warfare signal simulation recited in claim 1 wherein the band select means includes a matrix switch.

10. The apparatus for electronic warfare signal simulation recited in claim 1 wherein the band select means includes a signal splitter.

11. The apparatus for electronic warfare signal simulation recited in claim 1 wherein the band select means includes a signal combiner.

12. The apparatus for electronic warfare signal simulation recited in claim 1 wherein the band select means includes an attenuator.

13. The apparatus for electronic warfare signal simulation recited in claim 1 wherein the band select means includes a detector.

14. The apparatus for electronic warfare signal simulation recited in claim 1 wherein the control means includes a computer.

15. The apparatus for electronic warfare signal simulation recited in claim 1 wherein the control means includes a controller area network controller.

16. A method of electronic warfare signal simulation comprising the steps of:

generating and transmitting to a plurality of "victim" antennas a desired signal which is free of jamming effects;

generating and transmitting to the plurality of "victim" antennas one or more radio frequency control signals which represent one or more jamming threats in either or both of the low and mid bands;

coupling off the control signals representing jamming threats in the low band from signals received by the "victim" antennas and allowing the desired signal to pass with minimal perturbation;

coupling off the control signals representing jamming threats in the mid band from signals received by the "victim" antennas and allowing the desired signal to pass with minimal perturbation;

generating a plurality of simulated jamming signals each having a waveform representative of the jamming threat represented by a respective control signal;

measuring the levels of the received low and mid band control signals to determine the level an actual jamming signal from the corresponding jamming threat would have had;

translating the frequency of each simulated jamming signal to the frequency of the jamming threat to which it corresponds;

setting the level of each simulated jamming signal to the jamming level determined for its control signal;

replicating the "victim" antenna gains; and feeding the modified simulated jamming signals together with the desired signal to a plurality of "victim" receivers.

17. The method of electronic warfare signal simulation recited in claim 15 wherein the jamming signal generating step includes the step of pulse modulating a signal.

18. The method of electronic warfare signal simulation recited in claim 15 wherein the jamming signal generating step includes the step of modulating a signal with random noise.

19. The method of electronic warfare signal simulation recited in claim 15 wherein the jamming signal generating step includes the step of doubling the frequency of a signal.

20. The method of electronic warfare signal simulation recited in claim 15 wherein the jamming signal generating step includes the step of amplitude modulating a signal.

* * * * *